（12）United States Patent
Zhang et al.

(10) Patent No.: US 11,328,072 B2
(45) Date of Patent: May 10, 2022

(54) METHOD, APPARATUS, AND ELECTRONIC DEVICE FOR BLOCKCHAIN-BASED RECORDKEEPING

(71) Applicant: ADVANCED NEW TECHNOLOGIES CO., LTD., Grand Cayman (KY)

(72) Inventors: Hong Zhang, Hangzhou (CN); Haitao Jiang, Hangzhou (CN); Linqing Wang, Hangzhou (CN); Xinyu Weng, Hangzhou (CN); Fuqiang Li, Hangzhou (CN); Feng Lin, Hangzhou (CN); Jun Wu, Hangzhou (CN); Xiaodong Zeng, Hangzhou (CN); Lei Yang, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 268 days.

(21) Appl. No.: 16/668,437

(22) Filed: Oct. 30, 2019

(65) Prior Publication Data

US 2020/0134209 A1 Apr. 30, 2020

(30) Foreign Application Priority Data

Oct. 31, 2018 (CN) .......................... 201811289532.6

(51) Int. Cl.
*G06F 21/60* (2013.01)
*G06F 16/182* (2019.01)
(Continued)

(52) U.S. Cl.
CPC ........ *G06F 21/604* (2013.01); *G06F 16/1837* (2019.01); *H04L 9/0637* (2013.01); *H04L 9/3247* (2013.01); *H04N 21/8358* (2013.01)

(58) Field of Classification Search
CPC ..... H04L 9/0637; H04L 9/4347; G06F 21/64; G06F 21/602; G06F 21/604
See application file for complete search history.

(56) References Cited

U.S. PATENT DOCUMENTS

| 9,849,364 | B2 | 12/2017 | Tran et al. |
| 9,948,467 | B2 | 4/2018 | King |

(Continued)

FOREIGN PATENT DOCUMENTS

| CN | 104065648 A | 9/2014 |
| CN | 107169125 A | 9/2017 |

(Continued)

OTHER PUBLICATIONS

First Office Action dated Sep. 9, 2019, issued in Chinese Application No. 201811289532.6 (5 pages).

(Continued)

*Primary Examiner* — Dao Q Ho

(57) ABSTRACT

Provided is a method for blockchain-based recordkeeping and implementable by a terminal device. The method comprises: obtaining target data; computing a data digest of the target data, and extracting a key segment from the target data; signing, in a secure operation environment included in the terminal device, the data digest and/or the key segment based on a private key associated with the terminal device to generate a signature; and submitting to a blockchain the data digest, the key segment, and the signature, for one or more nodes in the blockchain to verify the signature based on a public key corresponding to the private key, and to record the data digest and the key segment in the blockchain in response to the signature being verified to be valid.

16 Claims, 2 Drawing Sheets

(51) Int. Cl.
*H04L 9/06* (2006.01)
*H04L 9/32* (2006.01)
*H04N 21/8358* (2011.01)

(56) References Cited

U.S. PATENT DOCUMENTS

| | | |
|---|---|---|
| 2012/0078864 A1 | 3/2012 | Li et al. |
| 2017/0237569 A1 | 8/2017 | Vandervort |
| 2017/0250972 A1 | 8/2017 | Ronda et al. |
| 2017/0352012 A1 | 12/2017 | Hearn et al. |
| 2018/0108024 A1 | 4/2018 | Greco et al. |
| 2018/0137512 A1 | 5/2018 | Georgiadis et al. |
| 2018/0183586 A1 | 6/2018 | Bhargav-Spantzel et al. |
| 2018/0241546 A1 | 8/2018 | Leng et al. |
| 2018/0247191 A1 | 8/2018 | Katz et al. |
| 2018/0262493 A1 | 9/2018 | Andrade |
| 2018/0308098 A1 | 10/2018 | Ebrahimi |
| 2019/0158274 A1* | 5/2019 | Tormasov .............. G06N 20/00 |
| 2019/0229927 A1 | 7/2019 | Guo et al. |

FOREIGN PATENT DOCUMENTS

| | | |
|---|---|---|
| CN | 107819777 A | 3/2018 |
| CN | 107888375 A | 4/2018 |
| CN | 207504911 U | 6/2018 |
| CN | 108537916 A | 9/2018 |
| CN | 108632381 A | 10/2018 |
| CN | 108650327 A | 10/2018 |
| CN | 108667811 A | 10/2018 |
| CN | 108717431 A | 10/2018 |
| WO | 2017145019 A1 | 8/2017 |
| WO | 2017155742 A1 | 9/2017 |
| WO | 2018089098 A1 | 5/2018 |
| WO | 2018157788 A1 | 9/2018 |
| WO | 2018189657 A1 | 10/2018 |

OTHER PUBLICATIONS

First Search dated Aug. 31, 2019, issued in Chinese Application No. 201811289532.6 (1 page).
International Preliminary Report on Patentability for PCT Application No. PCT/US2019/058763 dated Sep. 8, 2020.
Supplementary Search for Chinese Application No. 201811289532.6 dated Aug. 24, 2020.
Search Report for Taiwanese Application No. 108122850 dated Mar. 23, 2020.
Written Opinion and International Search Report for PCT Application No. PCT/US2019/058763 dated Feb. 5, 2020.
Second Office Action dated Jan. 13, 2020, issued in Chinese Application No. 201811289532.6.
Preinterview first office action for U.S. Appl. No. 15/931,879 dated Jun. 23, 2020.

* cited by examiner

METHOD, APPARATUS, AND ELECTRONIC DEVICE FOR BLOCKCHAIN-BASED RECORDKEEPING

CROSS REFERENCE TO RELATED APPLICATION

This application claims priority to the Chinese patent application No. 201811289532.6 filed on Oct. 31, 2018, and entitled "METHOD, APPARATUS, AND ELECTRONIC DEVICE FOR BLOCKCHAIN-BASED RECORDKEEPING," which is incorporated herein by reference in its entirety.

TECHNICAL FIELD

One or more embodiments of this specification relate to the field of blockchain technologies, and in particular, to a method, an apparatus, and an electronic device for blockchain-based recordkeeping.

BACKGROUND

Blockchain, also known as a distributed ledger technology, is an emerging technology in which multiple computing devices participate in "accounting" to maintain a complete distributed database jointly. The blockchain technology is decentralized and transparent, each computing device can participate in maintaining records in the database, and data can be quickly synchronized among the computing devices. With the aforementioned characteristics, the blockchain technology has been widely applied in many fields.

SUMMARY

This specification provides a method for blockchain-based recordkeeping and implementable by a terminal device. The method may comprise: obtaining target data; computing a data digest of the target data, and extracting a key segment from the target data; signing, in a secure operation environment included in the terminal device, the data digest and/or the key segment based on a private key associated with the terminal device to generate a signature; and submitting to a blockchain the data digest, the key segment, and the signature, for one or more nodes in the blockchain to verify the signature based on a public key corresponding to the private key, and to record the data digest and the key segment in the blockchain in response to the signature being verified to be valid.

In some embodiments, the private key associated with the terminal device is stored in the secure operation environment.

In some embodiments, the secure operation environment in the terminal device stores device authentication information and the device authentication information is signed based on the private key associated with the terminal device to generate another signature; and signing, in a secure operation environment included in the terminal device, the data digest and/or the key segment based on a private key associated with the terminal device to generate a signature comprises: verifying the another signature of the device authentication information based on the public key corresponding to the private key associated with the terminal device; and in response to the another signature being verified to be valid, determining that the terminal device is a valid terminal device and signing, in the secure operation environment included in the terminal device, the data digest and/or the key segment based on the private key to generate the signature.

In some embodiments, signing, in a secure operation environment included in the terminal device, the data digest and/or the key segment based on a private key associated with the terminal device to generate a signature comprises: signing, in the secure operation environment included in the terminal device, the data digest and the key segment as a whole based on the private key associated with the terminal device to generate the signature.

In some embodiments, signing, in a secure operation environment included in the terminal device, the data digest and/or the key segment based on a private key associated with the terminal device to generate a signature comprises: signing, in the secure operation environment included in the terminal device, the data digest based on the private key associated with the terminal device to generate the signature.

In some embodiments, the target data comprises video data; and extracting a key segment from the target data comprises: detecting an abnormal event in the video data; and in response to an abnormal event being detected, extracting a video segment corresponding to an occurrence period of the abnormal event as the key segment.

In some embodiments, the target data comprises audio data; and extracting a key segment from the target data comprises: detecting a preset keyword in the audio data; and in response to the preset keyword being detected, extracting an audio segment of a preset length comprising the preset keyword as the key segment.

In some embodiments, signing, in a secure operation environment included in the terminal device, the data digest and/or the key segment based on a private key associated with the terminal device to generate a signature comprises: obtaining identity information of a user using the terminal device; authenticating the identity of the user based on the obtained identity information; and signing, in the secure operation environment included in the terminal device, the data digest and/or the key segment based on the private key associated with the terminal device to generate the signature in response to the identity of the user being authenticated as valid.

In some embodiments, the method may further comprise: obtaining identity information of a user using the terminal device in response to the user using the terminal device for the first time; authenticating the identity of the user based on the obtained identity information; invoking a key generating algorithm to generate the private key and the public key in response to the identity of the user being authenticated as valid, wherein a key generating algorithm is stored in the secure operation environment included in the terminal device; and associating the generated private key with the identity information of the user, and storing the generated private key associated with the identity information of the user in the secure operation environment.

In some embodiments, signing, in a secure operation environment included in the terminal device, the data digest and/or the key segment based on a private key associated with the terminal device to generate a signature comprises: obtaining identity information of a user using the terminal device; determining whether a private key associated with the identity information is stored in the secure operation environment included in the terminal device; and signing, in the secure operation environment included in the terminal device, the data digest and/or the key segment based on the private key associated with the identity information in response to the private key associated with the identity information being stored in the secure operation environment included in the terminal device.

In some embodiments, the terminal device comprises a body-worn camera or an event data recorder. In some embodiments, the target data comprises video data, audio data, or image data, or a combination thereof.

This specification further provides an apparatus for blockchain-based recordkeeping. The apparatus is included in a terminal device. The apparatus may comprise: one or more processors and one or more non-transitory computer-readable memories coupled to the one or more processors and configured with instructions executable by the one or more processors to cause the apparatus to perform operations comprising: obtaining target data; computing a data digest of the target data, and extracting a key segment from the target data; signing, in a secure operation environment included in the terminal device, the data digest and/or the key segment based on a private key associated with the terminal device to generate a signature; and submitting to a blockchain the data digest, the key segment, and the signature, for one or more nodes in the blockchain to verify the signature based on a public key corresponding to the private key, and to record the data digest and the key segment in the blockchain in response to the signature being verified to be valid.

This specification further provides a non-transitory computer-readable storage medium included in a terminal device. The non-transitory computer-readable storage medium may be configured with instructions executable by one or more processors of the terminal device to cause the one or more processors to perform operations comprising: one or more processors and one or more non-transitory computer-readable memories coupled to the one or more processors and configured with instructions executable by the one or more processors to cause the apparatus to perform operations comprising: obtaining target data; computing a data digest of the target data, and extracting a key segment from the target data; signing, in a secure operation environment included in the terminal device, the data digest and/or the key segment based on a private key associated with the terminal device to generate a signature; and submitting to a blockchain the data digest, the key segment, and the signature, for one or more nodes in the blockchain to verify the signature based on a public key corresponding to the private key, and to record the data digest and the key segment in the blockchain in response to the signature being verified to be valid.

In one aspect, a hardware environment of a terminal device is improved. The terminal device includes a secure operation environment, and a private key corresponding to the terminal device is stored in the secure operation environment, so that when the terminal device records acquired data on the blockchain, the data to be recorded can be signed in the secure operation environment based on the private key, thereby preventing data recorded on the blockchain from being tampered with during propagation, and ensuring data security during recordkeeping on the blockchain.

In another aspect, by improving the process of recordkeeping on the blockchain, the terminal device may no longer need to record original content of acquired data on the blockchain; instead, the terminal device locally stores the original content of the acquired data, and records a data digest of the original content on the blockchain, so that the terminal device can be used as a hub between a physical world and a world on the blockchain, and the acquired data is recorded on the blockchain more conveniently. Moreover, for a third party that obtains data acquired by the terminal, the third party can conveniently verify the validity of the obtained data by matching a data digest of the obtained data with a data digest of the data which is recorded on the blockchain. Therefore, the data acquired by the terminal device can be submitted to the third party as proof or evidence, thereby greatly improving the usability of the data acquired by the terminal device.

In a third aspect, the terminal device records digest data of target data along with a key segment of the target data on the blockchain. Thus, if original content of the target data stored locally on the terminal device is lost, a user can obtain key information in the target data based on the key segment of the target data which is recorded on the blockchain, thereby minimizing the impact of the loss of original data on data usage.

DETAILED DESCRIPTION

Figure 1:
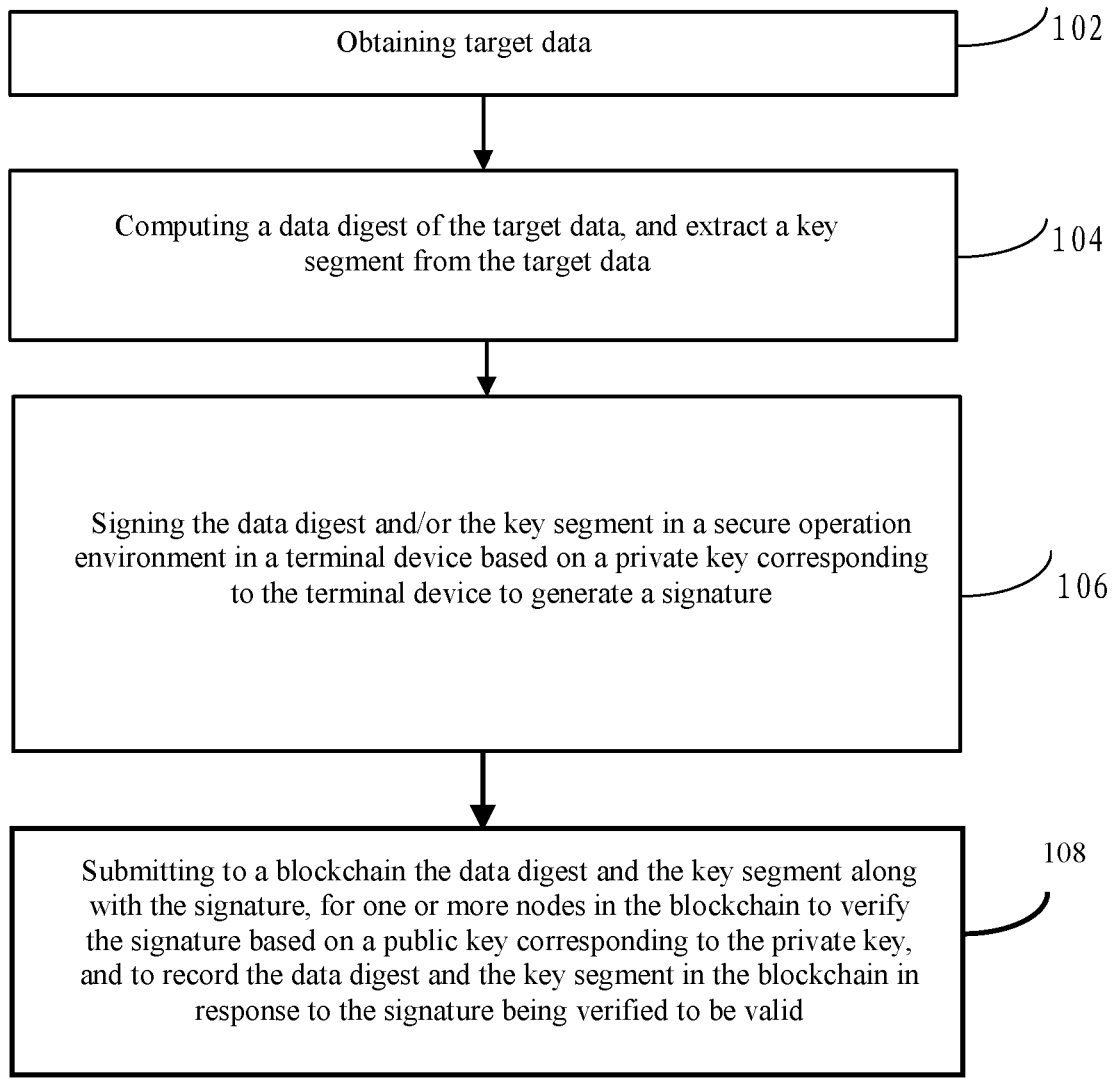
FIG. 1 is a flowchart of a method for blockchain-based recordkeeping according to some embodiments.

Because data stored on a blockchain cannot be tampered with, storing data on a blockchain for recordkeeping is a dominant trend in the industry at present.

However, in actual applications, some stream data, such as video stream and audio stream acquired by a body-worn camera or an event data recorder, may occupy a relatively large storage space, and therefore usually cannot be directly stored on the blockchain for recordkeeping.

However, in some scenarios, there is a strong demand to record such stream data. For example, in a judicial recordkeeping scenario, video stream acquired by a body-worn camera or an event data recorder may be submitted as proof or evidence to a judicial department.

Due to the lack of data authentication means, usually, the validity of such stream data as proof or evidence is widely questioned. Therefore, the best processing manner for such stream data is to store the data on the blockchain for recordkeeping. Moreover, storing data on blockchain for recordkeeping also makes it more convenient to verify the validity of the recorded data as judicial proof or evidence.

This specification provides embodiments in which a terminal device is used as a hub between a physical world and a world on the blockchain, so that data acquired by the terminal device is recorded on a blockchain more conveniently.

In some embodiments, a hardware environment of the terminal device may be improved. A secure operation environment is set up in the hardware environment of the terminal device, and a private key corresponding to the terminal device is stored and maintained in the secure operation environment.

For example, when the terminal device is a body-worn camera or an event data recorder, a security chip may be included in a hardware environment of the body-worn camera or the event data recorder, and a secure operation environment is set up based on the security chip. Therefore, the secure operation environment is included in the body-worn camera or the event data recorder. A private key owned by the body-worn camera or the event data recorder is stored and maintained in the secure operation environment. A secure operation environment is provided for the body worn camera or the event data recorder.

Further, after the terminal device acquires data to be recorded on a blockchain, a data digest of the acquired data is computed, and a key segment is extracted from the acquired data. Then, the computed data digest and the extracted key segment are signed in the secure operation environment based on the private key of the terminal device. The data digest and the key segment that are signed (e.g., along with a signature) are submitted to the blockchain.

After receiving the data digest and the key segment that are signed and submitted by the terminal device, a node in the blockchain may obtain a public key corresponding to the private key of the terminal device, and then verify the signature based on the public key; if the signature is verified to be valid, the data digest and the key segment may be stored into the blockchain for recordkeeping.

In the foregoing embodiments, in one aspect, a hardware environment of a terminal device is improved. The terminal device includes a secure operation environment, and a private key corresponding to the terminal device is stored in the secure operation environment, so that when the terminal device records acquired data on the blockchain, the data to be recorded can be signed in the secure operation environment based on the private key, thereby preventing data recorded on the blockchain from being tampered with during transmission, and ensuring data security during recordkeeping on the blockchain.

In another aspect, by improving the process of recordkeeping on the blockchain, the terminal device may no longer need to record original content of acquired data on the blockchain; instead, the terminal device locally stores the original content of the acquired data, and records a data digest of the original content on the blockchain, so that the terminal device can be used as a hub between a physical world and a world on the blockchain, and the acquired data is recorded on the blockchain more conveniently. Moreover, for a third party that obtains data acquired by the terminal, the third party can conveniently verify the validity of the obtained data by matching a data digest of the obtained data with a data digest of the data which is recorded on the blockchain. Therefore, the data acquired by the terminal device can be submitted to the third party as proof or evidence, thereby greatly improving the usability of the data acquired by the terminal device.

In a third aspect, the terminal device records digest data of target data along with a key segment of the target data on the blockchain. Thus, if original content of the target data stored locally on the terminal device is lost, a user can obtain key information in the target data based on the key segment of the target data which is recorded on the blockchain, thereby minimizing the impact of the loss of original data on data usage.

Referring to FIG. 1, FIG. 1 shows a method for blockchain-based recordkeeping according to some embodiments of this specification. The method is implementable by a terminal device, where the terminal device includes a secure operation environment, and a private key corresponding to the terminal device is stored in the secure operation environment. As shown in FIG. 1, the method may include the following steps.

Step 102. Obtaining target data.

Step 104. Computing a data digest of the target data, and extracting a key segment from the target data.

Step 106. Signing the data digest and/or the key segment in the secure operation environment based on the private key corresponding to the terminal device to generate a signature.

Step 108. Submitting to the blockchain the data digest and the key segment along with the signature, for one or more nodes in the blockchain to verify the signature based on a public key corresponding to the private key, and to record the data digest and the key segment in the blockchain in response to the signature being verified to be valid.

In some embodiments, the blockchain described may be a private blockchain, a public blockchain, a consortium blockchain, or the like. Alternatively, other types of blockchain may also be used. For example, the blockchain may be a consortium blockchain having the following member devices: a server of a third-party payment platform, a domestic bank server, an offshore bank server, and multiple user nodes. An entity operating the consortium blockchain may deploy online services such as consortium-blockchain-based cross-border account transfer and asset transfer.

In some embodiments, the terminal device may be any form of terminal device that can be added to the blockchain network as a node and can submit acquired data to the blockchain for recordkeeping. For example, the terminal device may include a body-worn camera, an event data recorder, or the like. The body-worn camera or the event data recorder may be added to the blockchain network as a node and submit acquired stream data, such as video data and audio data, to the blockchain for recordkeeping.

Recording data on the blockchain for recordkeeping may include permanently storing the data as proof or evidence on the blockchain.

In some embodiments, the target data may be any type of data that can be acquired by the terminal device and can be recorded in a distributed database of the blockchain network. For example, the target data may be stream data, such as video data, audio data, and image stream data, acquired by a terminal device such as a body-worn camera or an event data recorder.

In some embodiments, the key segment includes a data segment including key information in the target data. Which type of information in the target data is used as key information may depend on actual business requirements. For example, in an actual application, any type of information in the target data may be used as key information.

For example, when the target data is video data acquired by a body-worn camera or an event data recorder, the key segment may be a video segment including an abnormal event such as a traffic accident. In another example, when the target data is audio data acquired by a body-worn camera or an event data recorder, the key segment may be an audio segment including an abnormal keyword such as "help."

In some embodiments, a hardware environment of the terminal device may be improved. A secure operation environment is set up in the hardware environment of the terminal device, and a private key corresponding to the terminal device is stored and maintained in the secure operation environment. The secure operation environment is provided for the terminal device.

Different manners may be used to set up the secure operation environment in the hardware environment of the terminal device.

For example, the secure operation environment may be set up by introducing new hardware to the hardware environment of the terminal device, or the secure operation environment may be set up by improving a software environment of existing hardware in the hardware environment of the terminal device. Alternatively, the secure operation environment may be set up by both introducing new hardware to the hardware environment of the terminal device and improving a software environment of existing hardware in the hardware environment of the terminal device.

For example, a secure operation environment may be set up for the terminal device based on a secure element (SE). For example, SE hardware may be introduced to the hardware environment of the terminal device. The SE hardware may be built-in hardware in the hardware environment of the terminal device, or may be external hardware connected to the terminal device through an interface. The private key corresponding to the terminal device is stored and maintained by using the SE hardware, and the secure operation environment is provided for the terminal device.

In another example, a secure operation environment may be set up for the terminal device based on a Trusted Execution Environment (TEE). For example, a software environment of existing hardware (such as a main chip) in the hardware environment of the terminal device may be improved to set up a trusted execution environment in the software environment. The private key corresponding to the terminal device is stored and maintained in the trusted execution environment, and the secure operation environment is provided for the terminal device.

In a third example, a secure operation environment may be set up for the terminal device based on both SE and TEE. For example, the private key corresponding to the terminal device may be stored and maintained by using SE hardware, and the secure operation environment is provided for the terminal device by using a TEE.

The foregoing embodiments of setting up the secure operation environment for the terminal device are merely examples. In actual applications, the secure operation environment may also be set up for the terminal device by using other implementation means, and the implementation means are not enumerated.

In some embodiments, the terminal device may be added to the blockchain network as a node (which is also referred to as placing a device onto the blockchain), and the private key corresponding to the terminal device is stored and maintained in the secure operation environment set up for the terminal device.

The private key corresponding to the terminal device may be a private key owned by the terminal device, or may be a private key owned by a user of the terminal device. For example, "the private key corresponding to the terminal device" described may be a private key that is generated by a device manufacturer of the terminal device for the terminal device during a device manufacturing stage and is owned by the terminal device; or may be a private key that is generated autonomously by the terminal device for a user when the user uses the terminal device and is owned by the user.

In some embodiments, the private key and the public key owned by the terminal device may be generated by the device manufacturer for the terminal device during the device manufacturing stage, and the device manufacturer may write the private key into the secure operation environment of the terminal device in advance for storage and maintenance. Thus, the private key and the public key owned by the terminal device may not be associated with the identity of a user of the terminal device. Different users of the terminal device can share the same private key written into the secure operation environment of the terminal device by the device manufacturer by default.

In other embodiments, the private key and the public key owned by the terminal device may be generated autonomously by the terminal device for a user of the terminal device, and the terminal device autonomously writes the private key into the secure operation environment of the terminal device. Thus, the private key and the public key autonomously generated by the terminal device may be associated with the identity of a user of the terminal device. Based on identity information of different users, the terminal device may generate a pair of private key and public key for each user, associate the generated private keys with the identity information of the users, and then store and maintain the private keys, the identity information of the users, and association relationships of the private keys and the identity information of the users in the secure operation environment.

For example, during implementation, the manufacturer of the terminal device may write a key generating algorithm into the secure operation environment of the terminal device in advance. When a user of the terminal device uses the terminal device, the terminal device may prompt the user to input identity information for identity authentication. A data type of the identity information input by the user and an identity authentication manner used by the terminal device are not limited. For example, a conventional authentication manner of inputting a password or a token may be used, or an authentication manner based on a physiological feature such as a fingerprint or a human face may be used.

After the terminal device obtains the identity information input by the user, it can be determined whether a private key associated with the identity information is stored in the secure operation environment. If the private key associated with the identity information is not stored in the secure operation environment, it may indicate that the user is a new user using the terminal device for the first time. In this situation, the terminal device can perform identity authentication on the user based on the obtained identity information. If the identity authentication on the user succeeds, the terminal device may invoke the key generating algorithm in the secure operation environment to generate a pair of private key and public key, associate the generated private key with the identity information of the user, and then store and maintain the private key, the identity of the user, and an association relationship between the private key and the identity of the user in the secure operation environment.

In some embodiments, the user may acquire data by using the terminal device, and record the acquired data on the blockchain by using the terminal device.

In some embodiments, the terminal device may store acquired data locally, and record, on the blockchain, a data digest of the acquired data and a key segment extracted from the acquired data. The terminal device may no longer record original content of the acquired data on the blockchain.

In some embodiments, if the target data acquired by the terminal device is stream data such as video stream data and audio stream data, when recording such stream data on the blockchain, the terminal device may record the stream data in a fragmented manner according to a preset time cycle.

For example, taking video data as an example, the terminal device may use video data in every N minute as a fragment (e.g., N is an integer), compute a data digest of the fragment, then record the data digest of the fragment on the blockchain. In addition, the terminal device may strictly ensure a chronological order of data digests of fragments recorded on the blockchain to facilitate tracing of the data digests and fragments. In some embodiments, when recording the acquired target data on the blockchain, the terminal device may compute a data digest of the target data, and extract a key segment from the target data. For example, the data digest may be a hash value of the target data computed based on a hash algorithm. Extracting the key segment from the target data may be implemented in different manners.

For example, if the target data is video data, when extracting a key segment from the video data, the terminal device may store a video analysis algorithm in advance, and perform abnormal event detection on the video data by using the stored video analysis algorithm. If an abnormal event is detected in the video data, an occurrence period of the abnormal event may be determined through an algorithm, and a video segment corresponding to the occurrence period of the abnormal event is extracted as the key segment. For example, the occurrence period of an abnormal event may be a time period from N seconds before to N seconds after the occurrence moment of the abnormal event. N may be any integer, such as 1, 2, 3, 4, 5, etc.

The type of the abnormal event may be customized based on an actual business requirement. For example, for video data acquired by an event data recorder, an abnormal event may include abnormal traffic such as a "car crash," or other accidents. The video analysis algorithm stored in the terminal device can be any video analysis algorithm. In addition, the process of performing, by the terminal device, abnormal detection on the video data by using the stored video analysis algorithm will not be described in detail. Those skilled in the art may refer to descriptions in related technologies.

In some embodiments, if the target data is audio data, when extracting a key segment from the audio data, the terminal device may perform keyword detection on the audio data (e.g., based on a preset keyword). If the preset keyword is detected in the audio data, an audio segment of a preset length including the preset keyword may be extracted as the key segment. For example, an audio segment from N seconds before to N seconds after the position of the detected preset keyword may be extracted as the key segment. N may be any integer, such as 1, 2, 3, 4, 5, etc. The preset keyword may be customized based on an actual requirement. For example, a keyword capable of indicating that a user is in an abnormal situation, such as "help," may be used as the preset keyword.

The target data being video data and audio data is merely examples. Obviously, in actual applications, the target data may be data of other types different from the video data and the audio data. For example, the target data may also be text data. If the target data is text data, a trunk of text (e.g., the subject, verb, and object) may be extracted by using an algorithm, and thus the valid information in the text data is extracted as the key segment.

In some embodiments, after the terminal device computes the data digest of the target data and extracts the key segment from the target data, the terminal device may sign the data digest and the key segment in the secure operation environment based on the private key stored in the secure operation environment, and then submit, to the blockchain, the data digest and the key segment that are signed.

When signing the data digest and the key segment in the secure operation environment based on the private key stored in the secure operation environment, the terminal may sign the data digest and the key segment as a whole, and then submit the signed data digest and key segment to the blockchain; alternatively, the terminal device may only sign the data digest in the secure operation environment based on the private key stored in the secure operation environment, and submit the key segment and the signed data digest to the blockchain.

In the following, signing the data digest and the key segment as a whole is taken as an example for description.

In some embodiments, device authentication information signed based on a private key owned by a manufacturer of the terminal device may further be stored and maintained in the secure operation environment of the terminal device. For example, the manufacturer of the terminal device may sign the device authentication information based on a private key of the manufacturer during a device manufacturing stage (e.g., to generate a signature of the device authentication information), and then write the signed device authentication information into the secure operation environment for storage and maintenance. The device authentication information may be any form of information that can be used for authenticating the validity of the terminal device. For example, the device authentication information may be a production number of the terminal device, or anti-counterfeit information in other forms.

Before signing the data digest and the key segment in the secure operation environment based on the private key stored in the secure operation environment, the terminal device may obtain a public key corresponding to the private key owned by the manufacturer of the terminal device, and verify the signature of the device authentication information based on the obtained public key. If the verification succeeds, it can be determined that the terminal device is a valid terminal device manufactured by the manufacturer. Thus, the terminal device further signs the data digest and the key segment in the secure operation environment based on the private key stored in the secure operation environment.

In this way, validity verification of the terminal device may be introduced before the digest data and the key segment on the blockchain are signed based on the private key stored in the secure operation environment, to prevent behaviors of storing data onto the blockchain by some invalid devices (for example, a forged device or a maliciously modified invalid device) in time, thereby improving the security level of data to be recorded on the blockchain.

In some embodiments, if the private key stored and maintained in the secure operation environment of the terminal device is a private key that is generated by the device manufacturer for the terminal device in the device manufacturing stage and owned by the terminal device, then an identity authentication mechanism for a user of the terminal device may be initiated to prompt the user to input the user's identity information for identity authentication of the user. After obtaining the identity information input by the user, the terminal device may perform identity authentication on the user based on the obtained identity information. If the identity authentication on the user succeeds (i.e., the identity information of the user is valid), the terminal device may sign the data digest and the key segment in the secure operation environment based on the private key stored and maintained in the secure operation environment and owned by the terminal device.

In some embodiments, if the private key of the terminal device stored and maintained in the secure operation environment is a private key that is autonomously generated by the terminal device for a user and owned by the user, then an association relationship between identity information and the private key of the user is stored and maintained in the secure operation environment in advance. In this situation, after obtaining identity information input by the user, the terminal device may query the association relationship maintained in the secure operation environment to determine whether a private key associated with the identity information is stored in the secure operation environment.

If the private key associated with the identity information is stored in the secure operation environment, the terminal device may sign the data digest and the key segment in the secure operation environment based on the private key.

If the private key associated with the identity information is not stored in the secure operation environment, it may indicate that the user is a new user using the terminal device for the first time. In this situation, the terminal device can perform identity authentication on the user based on identity information of the user. After the identity authentication succeeds, the terminal device invokes a key generating algorithm stored in the secure operation environment to generate a private key and a public key for the user, signs the data digest by using the generated private key, associates the generated private key with the identity information of the user, and then stores and maintains an association relationship between the generated private key and the identity information of the user in the secure operation environment.

In some embodiments, after signing the data digest and the key segment of the acquired target data in the secure operation environment based on the private key stored in the secure operation environment, the terminal device may submit, to the blockchain, the data digest and the key segment that are signed. For example, a blockchain-based transaction may be constructed based on the signed data digest, and the transaction is broadcast and spread to other nodes.

After receiving the data digest and the key segment that are signed, a node in the blockchain may obtain a public key corresponding to the private key stored in the secure operation environment, and then verify the signature based on the obtained public key. If the signature is verified as valid, the node can initiate, in the blockchain, consensus processing for the data digest and the key segment. After the data digest and the key segment pass the consensus processing, the node packages the data digest and the key segment into a block to be stored in the blockchain, so as to complete recordkeeping for the data digest.

Different consensus mechanisms may be used by the blockchain. For example, an entity operating the blockchain may select a consensus mechanism flexibly based on an actual requirement.

In some embodiments, when recording the acquired target data on the blockchain, the terminal device may further record description data of the target data along with the data digest and the key segment of the target data on the blockchain.

For example, when signing the data digest and the key segment of the target data in the secure operation environment based on the private key stored in the secure operation environment, the terminal device may sign the data digest, the key segment, and the description information of the target data as a whole. That is, the data digest, the key segment, and the description information of the target data are packaged and then signed as a whole, and the signed data digest, key segment, and description data of the target data are submitted to the blockchain for recordkeeping. For example, the terminal device may construct a blockchain-based transaction based on the signed data digest, key segment, and description data of the target data, and broadcast and spread the transaction to other nodes.

Alternatively, when signing the data digest and the key segment of the target data in the secure operation environment based on the private key stored in the secure operation environment, the terminal device may sign the data digest and the key segment only, and then submit the description data of the target data as well as the signed data digest and key segment to the blockchain for recordkeeping. For example, the terminal device may construct a blockchain-based transaction based on the description data of the target data as well as the signed data digest and key segment, and broadcast and spread the transaction to other nodes.

The description information of the target data may include any content. For example, the description information may contain any content related to the target data in actual applications.

In some embodiments, the acquisition time of the data, the acquisition location of the data, and the object related to the acquired data are usually crucial attributes of the data as evidence or proof. Therefore, in some embodiments, the description information of the target data may include one of the acquisition time of the data, the acquisition location of the data, and the object related to the acquired data, or a combination thereof.

In some embodiments, the acquisition time of target data may be a certified authoritative moment (timestamp) obtained from a time certificate authority by interacting with the time certificate authority when the terminal device obtains the target data. The acquisition location of the target data may be a precise acquisition site obtained by invoking, in real time, a positioning module (such as a Global Positioning System (GPS) module) included in the terminal device when the terminal device acquires the target data. The object related to the target data may be a related object manually input by a valid user of the terminal device after the terminal device acquires the target data.

Taking forensic video data of a car accident acquired by a body-worn camera as an example, description information of the video data may include a certified authoritative moment (i.e., acquisition time) obtained from the time certificate authority at the moment when the video data is acquired, a precise acquisition location obtained by the body-worn camera through invoking the positioning module in real time at the moment when the video data is acquired, and vehicle information, driver information, and the like, related to the video data, which are input by a law enforcer.

In the foregoing embodiments, in one aspect, a hardware environment of a terminal device is improved. The terminal device includes a secure operation environment, and a private key corresponding to the terminal device is stored in the secure operation environment, so that when the terminal device records acquired data on the blockchain, the data to be recorded can be signed in the secure operation environment based on the private key, thereby preventing data recorded on the blockchain from being tampered with during propagation, and ensuring data security during recordkeeping on the blockchain.

In another aspect, by improving the process of recordkeeping on the blockchain, the terminal device may no longer need to record original content of acquired data on the blockchain; instead, the terminal device locally stores the original content of the acquired data, and records a data digest of the original content on the blockchain, so that the terminal device can be used as a hub between a physical world and a world on the blockchain, and the acquired data is recorded on the blockchain more conveniently. Moreover, for a third party that obtains data acquired by the terminal, the third party can conveniently verify the validity of the obtained data by matching a data digest of the obtained data with a data digest of the data which is recorded on the blockchain. Therefore, the data acquired by the terminal device can be submitted to the third party as proof or evidence, thereby greatly improving the usability of the data acquired by the terminal device.

In a third aspect, the terminal device records digest data of target data along with a key segment of the target data on the blockchain. Thus, if original content of the target data stored locally on the terminal device is lost, a user can obtain key information in the target data based on the key segment of the target data which is recorded on the blockchain, thereby minimizing the impact of the loss of original data on data usage.

For example, a terminal device such as a body-worn camera or an event data recorder may locally store original content of acquired stream data such as video data and audio data, and record a data digest of the original content of the stream data on the blockchain, and may no longer need to record the original content of the stream data on the blockchain.

Moreover, when a user submits the stream data acquired by the body-worn camera or the event data recorder as proof or evidence to a third-party organization (such as a judicial department or an insurance company), the third-party organization can verify the validity of the obtained data conveniently by re-computing a data digest of the obtained data and matching the data digest of the data with the data digest of the data recorded on the blockchain. In this way, the usability of the data acquired by the body-worn camera or the event data recorder as valid proof or evidence can be greatly improved.

Further, the body-worn camera or the event data recorder records digest data of acquired stream data along with a key segment of the stream data on the blockchain. Therefore, even when original content of the stream data stored locally on the body-worn camera or the event data recorder is lost, a user can obtain key information in the stream data based on the key segment of the stream data that is recorded on the blockchain, thereby minimizing the impact of the loss of original data on data usage.

Figure 2:
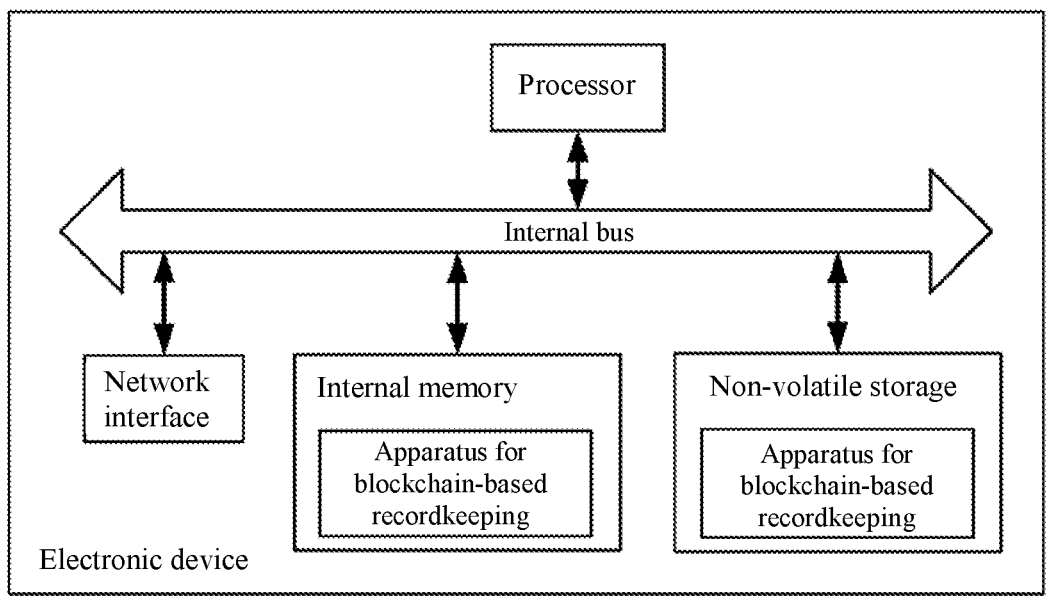
FIG. 2 is a schematic structural diagram of an electronic device for blockchain-based recordkeeping according to some embodiments.

Similar to the foregoing method embodiments, this specification further provides embodiments of an apparatus for blockchain-based recordkeeping. The embodiments of the apparatus for blockchain-based recordkeeping may be applied to an electronic device. The electronic device includes a secure operation environment, and a private key corresponding to the electronic device is stored in the secure operation environment. The apparatus embodiments may be implemented by software, hardware, or a combination of software and hardware. Taking software implementation as an example, as a logical apparatus, the apparatus is formed in the following manner: a processor of the electronic device where the apparatus is located reads corresponding computer program instructions in a non-volatile memory into an internal memory and executes the computer program instructions. At a hardware level, FIG. 2 is a schematic structural diagram of an electronic device for blockchain-based recordkeeping according to some embodiments. In addition to a processor, an internal memory, a network interface, and a non-volatile storage shown in FIG. 2, the electronic device where the apparatus is located may further include other hardware according to actual functions of the electronic device, and details are not described herein.

Figure 3:
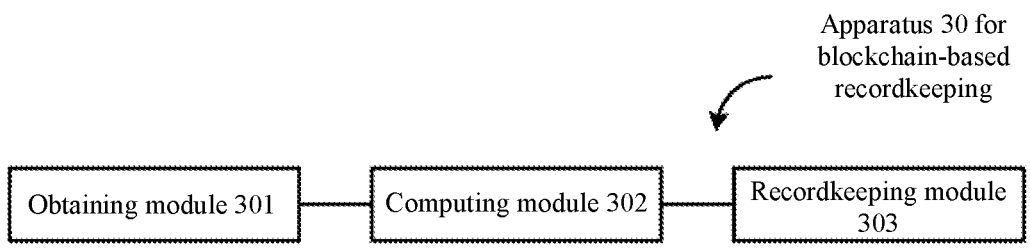
FIG. 3 is a block diagram of an apparatus for blockchain-based recordkeeping according to some embodiments.

FIG. 3 is a block diagram of an apparatus for blockchain-based recordkeeping according to some embodiments. Referring to FIG. 3, the apparatus 30 for blockchain-based recordkeeping may be applied to the electronic device shown in FIG. 2. The electronic device may be a terminal device. The apparatus includes: an obtaining module 301, a computing module 302, and a recordkeeping module 303. The obtaining module 301 is configured to obtain target data. For example, the target data has been acquired by a body-worn camera or an event data recorder. The computing module 302 is configured to compute a data digest of the target data, and extract a key segment from the target data.

The recordkeeping module 303 is configured to sign the data digest and the key segment in the secure operation environment based on the private key of the electronic device to generate a signature, and submit, to the blockchain, the data digest and the key segment that are signed, for a node in the blockchain to verify the signature based on a public key corresponding to the private key, and to record the data digest and the key segment in the blockchain in response to the signature being verified to be valid.

In some embodiments, the recordkeeping module 303 is configured to: sign the data digest and the key segment as a whole in the secure operation environment based on the private key of the electronic device, and submit the signed data digest and key segment to the blockchain. In other embodiments, the recordkeeping module 303 is configured to: sign the data digest in the secure operation environment based on the private key of the electronic device, and submit the key segment and the signed data digest to the blockchain.

In some embodiments, the target data includes video data; and the computing module 302 is further configured to: detect an abnormal event in the video data; and in response to an abnormal event being detected in the video data, extract a video segment corresponding to an occurrence period of the abnormal event as the key segment.

In some embodiments, the target data includes audio data; and the computing module 302 is further configured to: detect a preset keyword in the audio data; and in response to a preset keyword being detected in the audio data, extract an audio segment of a preset length including the preset keyword as the key segment.

In some embodiments, the recordkeeping module 303 is configured to: obtain identity information of a user using the electronic device; authenticate the identity of the user based on the obtained identity information; and sign the data digest and the key segment in the secure operation environment based on the private key of the electronic device in response to the identity of the user being authenticated as valid.

In some embodiments, a key generating algorithm is generated in the secure operation environment; and the recordkeeping module 303 is configured to: obtain identity information of a user using the electronic device in response to the user uses the electronic device for the first time; authenticate the identity of the user based on the obtained identity information; invoke the key generating algorithm in the secure operation environment to generate the private key and the public key in response to the identity of the user being authenticated as valid; and associate the generated private key with the identity information of the user, and store an association relationship between the generated private key and the identity information of the user in the secure operation environment.

In some embodiments, the recordkeeping module 303 is further configured to: obtain identity information of a user using the electronic device; determine whether a private key associated with the identity information is stored in the secure operation environment; and sign the data digest and the key segment in the secure operation environment based on the private key associated with the identity information in response to the private key associated with the identity information being stored in the secure operation environment.

In some embodiments, device authentication information signed based on a private key owned by a manufacturer of the electronic device is further stored in the secure operation environment; and the recordkeeping module 303 is further configured to: verify, before signing the data digest and the key segment in the secure operation environment based on the private key corresponding to the electronic device, a signature of the device authentication information based on a public key corresponding to the private key owned by the manufacturer of the electronic device; and determine that the electronic device is a valid electronic device manufactured by the manufacturer in response to the signature of the device authentication information being verified to be valid, and further signing the data digest and the key segment in the secure operation environment based on the private key corresponding to the electronic device.

In some embodiments, the electronic device includes a body-worn camera or an event data recorder; and the target data includes video data, audio data, or image data, or a combination thereof.

For details of the implementation of the functions and effects of each module in the foregoing apparatus, refer to the implementation of the corresponding steps in the foregoing methods. Details are not described herein again.

The apparatus embodiments are similar to the method embodiments. Therefore, for related parts, reference may be made to the descriptions in the method embodiments. The described apparatus embodiments is merely schematic. The modules described as separate parts may or may not be physically separate, and the parts displayed as modules may or may not be physical modules, may be located in one position, or may be distributed on multiple network modules. Some or all of the modules may be selected according to actual needs to achieve the objectives of this specification. Those of ordinary skill in the art can understand and implement this specification without creative efforts.

The systems, apparatus, or modules illustrated in the foregoing embodiments may be implemented by a computer chip or an entity, or implemented by a product having some function. A typical implementation device may be a computing device, and examples of the computing device may include a personal computer, a laptop computer, a cellular phone, a camera phone, a smartphone, a personal digital assistant, a media player, a navigation device, an email sending and receiving device, a game console, a tablet computer, or a wearable device, or a combination of any of these devices.

Similar to the foregoing method embodiments, this specification further provides embodiments of an electronic device. The electronic device includes: a processor and a memory configured to store machine executable instructions. The processor and the memory are usually interconnected through an internal bus. In other embodiments, the device may further include an external interface, so as to enable the device to communicate with other devices or components.

In some embodiments, by reading and executing machine executable instructions stored in the memory and corresponding to control logic for blockchain-based recordkeeping, the processor is caused to: obtain target data, the electronic device comprising a secure operation environment, and a private key corresponding to the electronic device being stored in the secure operation environment; compute a data digest of the target data, and extract a key segment from the target data; and sign the data digest and the key segment in the secure operation environment based on the private key corresponding to the terminal device to generate a signature, and submit to the blockchain the data digest and the key segment that are signed, for a node in the blockchain to verify the signature based on a public key corresponding to the private key, and record the data digest and the key segment in the blockchain in response to the signature being verified to be valid.

In some embodiments, by reading and executing machine executable instructions stored in the memory and corresponding to control logic for blockchain-based recordkeeping, the processor is caused to: sign the data digest and the key segment as a whole in the secure operation environment based on the private key corresponding to the terminal device, and submit the signed data digest and key segment to the blockchain; or sign the data digest in the secure operation environment based on the private key corresponding to the terminal device, and submit the key segment and the signed data digest to the blockchain.

In some embodiments, the target data includes video data; and by reading and executing machine executable instructions stored in the memory and corresponding to control logic for blockchain-based recordkeeping, the processor is caused to: detect an abnormal event in the video data; and in response to an abnormal event being detected in the video data, extract a video segment corresponding to an occurrence period of the abnormal event as the key segment.

In some embodiments, the target data includes audio data; and by reading and executing machine executable instructions stored in the memory and corresponding to control logic for blockchain-based recordkeeping, the processor is caused to: detect a preset keyword in the audio data; and in response to the preset keyword being detected in the audio data, extract an audio segment of a preset length including the preset keyword as the key segment.

In some embodiments, by reading and executing machine executable instructions stored in the memory and corresponding to control logic for blockchain-based recordkeeping, the processor is caused to: obtain identity information of a user using the terminal; authenticate identity of the user based on the obtained identity information; and sign the data digest and the key segment in the secure operation environment based on the private key corresponding to the terminal device in response to the identity of the user being authenticated to be valid.

In some embodiments, a key generating algorithm is generated in the secure operation environment; and by reading and executing machine executable instructions stored in the memory and corresponding to control logic for blockchain-based recordkeeping, the processor is caused to: obtain identity information of a user of the terminal device in response to the user using the terminal device for the first time; authenticate identity of the user based on the obtained identity information; invoke the key generating algorithm in the secure operation environment to generate the private key and the public key in response to the identity of the user being authenticated to be valid; and associate the generated private key with the identity information of the user, and store an association relationship in the secure operation environment.

In some embodiments, by reading and executing machine executable instructions stored in the memory and corresponding to control logic for blockchain-based recordkeeping, the processor is caused to: obtain identity information of a user using the terminal; determine whether a private key associated with the identity information is stored in the secure operation environment; and sign the data digest and the key segment in the secure operation environment based on the private key associated with the identity information in response to the private key associated with the identity information being stored in the secure operation environment.

In some embodiments, device authentication information signed based on a private key owned by a manufacturer of the terminal device is further stored in the secure operation environment; and by reading and executing machine executable instructions stored in the memory and corresponding to control logic for blockchain-based recordkeeping, the processor is caused to: verify, before signing the data digest and the key segment in the secure operation environment based on the private key corresponding to the terminal device, the signature of the device authentication information based on a public key corresponding to the private key owned by the manufacturer of the terminal device; and determine that the terminal device is a valid terminal device manufactured by the manufacturer in response to the signature being verified to be valid, and signing the data digest and the key segment in the secure operation environment based on the private key corresponding to the terminal device.

Other embodiments of this specification will be obvious to those skilled in the art based on the specification disclosed herein. This specification is intended to cover any variations, uses, or adaptations of the embodiments following the general principles thereof and including such departures from this specification as come within known or customary practice in the art. The specification and examples are intended to be exemplary, with a scope and spirit of this specification being indicated by the following claims.

It will be appreciated that this specification is not limited to the exact constructions that have been described above and illustrated in the accompanying drawings. Various modifications and changes can be made without departing from the scope thereof. It is intended that the scope of this specification be limited by the appended claims.

The foregoing descriptions are some embodiments of this specification, and are not intended to limit this specification. Any modification, equivalent replacement, or improvement made within the spirit and principle of this specification shall fall within the protection scope of this specification.

What is claimed is:

1. A method for blockchain-based recordkeeping, implementable by a terminal device, the method comprising:
    storing a first signature in a secure operation environment of the terminal device, wherein the first signature comprises device authentication information signed based on a first private key associated with a manufacturer of the terminal device;
    obtaining target data, wherein the target data comprises video data;
    computing a data digest of the target data;
    extracting a key segment from the target data comprises:
        detecting an abnormal event in the video data; and
        in response to the abnormal event being detected:
        extracting a video segment corresponding to an occurrence period of the abnormal event as the key segment;
    verifying the first signature of the device authentication information based on a first public key corresponding to the first private key associated with the manufacturer of the terminal device;
    in response to verifying the first signature:
    determining that the terminal device is a valid terminal device; and
    signing, in the secure operation environment of the terminal device, the data digest and/or the key segment based on a second private key associated with the terminal device to generate a second signature; and
    submitting to a blockchain the data digest, the key segment, and the second signature, for one or more nodes in the blockchain to verify the second signature based on a second public key corresponding to the second private key associated with the terminal device, and to record the data digest and the key segment in the blockchain in response to the second signature being verified to be valid.

2. The method according to claim 1, wherein the second private key associated with the terminal device is stored in the secure operation environment.

3. The method according to claim 1, wherein signing, in the secure operation environment of the terminal device, the data digest and/or the key segment based on the second private key associated with the terminal device to generate the second signature comprises:
    signing, in the secure operation environment of the terminal device, the data digest and the key segment as a whole based on the second private key associated with the terminal device to generate the second signature.

4. The method according to claim 1, wherein signing, in the secure operation environment of the terminal device, the data digest and/or the key segment based on the second private key associated with the terminal device to generate the second signature comprises:
    signing, in the secure operation environment of the terminal device, the data digest based on the second private key associated with the terminal device to generate the second signature.

5. The method according to claim 1, wherein the target data comprises audio data; and
    extracting the key segment from the target data comprises:
        detecting a preset keyword in the audio data, and
        in response to the preset keyword being detected, extracting an audio segment of a preset length comprising the preset keyword as the key segment.

6. The method according to claim 1, wherein signing, in the secure operation environment of the terminal device, the data digest and/or the key segment based on the second private key associated with the terminal device to generate the second signature comprises:
    obtaining identity information of a user using the terminal device;
    authenticating the identity of the user based on the obtained identity information; and
    signing, in the secure operation environment of the terminal device, the data digest and/or the key segment based on the second private key associated with the terminal device to generate the second signature in response to the identity of the user being authenticated as valid.

7. The method according to claim 1, wherein the method further comprises:
    obtaining identity information of a user using the terminal device in response to the user using the terminal device for the first time;
    authenticating the identity of the user based on the obtained identity information;
    invoking a key generating algorithm to generate the second private key associated with the terminal device and the second public key corresponding to the second private key associated with the terminal device in response to the identity of the user being authenticated as valid, wherein a key generating algorithm is stored in the secure operation environment of the terminal device; and
    associating the generated second private key with the identity information of the user, and storing the generated second private key associated with the identity information of the user in the secure operation environment.

8. The method according to claim 7, wherein signing, in the secure operation environment of the terminal device, the data digest and/or the key segment based on the second private key associated with the terminal device to generate the second signature comprises:
obtaining identity information of a user using the terminal device;
determining whether the second private key associated with the identity information is stored in the secure operation environment included in the terminal device; and
signing, in the secure operation environment included in the terminal device, the data digest and/or the key segment based on the second private key associated with the identity information in response to the second private key associated with the identity information being stored in the secure operation environment included in the terminal device.

9. The method according to claim 1, wherein the terminal device comprises a body-worn camera or an event data recorder.

10. The method according to claim 1, wherein the target data comprises video data, audio data, or image data, or a combination thereof.

11. An apparatus for blockchain-based recordkeeping, included in a terminal device, the apparatus comprising:
one or more processors and one or more non-transitory computer-readable memories coupled to the one or more processors and configured with instructions executable by the one or more processors to cause the apparatus to perform operations comprising:
storing a first signature in a secure operation environment of the terminal device, wherein the first signature comprises device authentication information signed based on a first private key associated with a manufacturer of the terminal device;
obtaining target data, wherein the target data comprises video data;
computing a data digest of the target data;
extracting a key segment from the target data comprises:
detecting an abnormal event in the video data; and
in response to the abnormal event being detected:
extracting a video segment corresponding to an occurrence period of the abnormal event as the key segment;
verifying the first signature of the device authentication information based on a first public key corresponding to the first private key associated with the manufacturer of the terminal device;
in response to verifying the first signature;
determining that the terminal device is a valid terminal device, and
signing, in the secure operation environment of the terminal device, the data digest and/or the key segment based on a second private key associated with the terminal device to generate a second signature; and
submitting to a blockchain the data digest, the key segment, and the signature, for one or more nodes in the blockchain to verify the signature based on a second public key corresponding to the second private key associated with the terminal device, and to record the data digest and the key segment in the blockchain in response to the second signature being verified to be valid.

12. The apparatus according to claim 11, wherein the second private key associated with the terminal device is stored in the secure operation environment.

13. The apparatus according to claim 11, wherein signing, in the secure operation environment of the terminal device, the data digest and/or the key segment based on the second private key associated with the terminal device to generate the second signature comprises:
signing, in the secure operation environment of the terminal device, the data digest and the key segment as a whole based on the second private key associated with the terminal device to generate the second signature.

14. The apparatus according to claim 11, wherein signing, in the secure operation environment of the terminal device, the data digest and/or the key segment based on the second private key associated with the terminal device to generate the second signature comprises:
signing, in the secure operation environment of the terminal device, the data digest based on the second private key associated with the terminal device to generate the second signature.

15. The apparatus according to claim 11, wherein the target data comprises audio data; and
extracting the key segment from the target data comprises:
detecting a preset keyword in the audio data, and
in response to the preset keyword being detected, extracting an audio segment of a preset length comprising the preset keyword as the key segment.

16. A non-transitory computer-readable storage medium, included in a terminal device and configured with instructions executable by one or more processors of the terminal device to cause the one or more processors to perform operations comprising:
storing a first signature in a secure operation environment of the terminal device, wherein the first signature comprises device authentication information signed based on a first private key associated with a manufacturer of the terminal device;
obtaining target data, wherein the target data comprises video data;
computing a data digest of the target data;
extracting a key segment from the target data comprises:
detecting an abnormal event in the video data; and
in response to the abnormal event being detected:
extracting a video segment corresponding to an occurrence period of the abnormal event as the key segment;
verifying the first signature of the device authentication information based on a first public key corresponding to the first private key associated with the manufacturer of the terminal device;
in response to verifying the first signature;
determining that the terminal device is a valid terminal device, and
signing, in a secure operation environment included in the terminal device, the data digest and/or the key segment based on a private key associated with the terminal device to generate a second signature; and
submitting to a blockchain the data digest, the key segment, and the second signature, for one or more nodes in the blockchain to verify the second signature based on a second public key corresponding to the second private key associated with the terminal device, and to record the data digest and the key segment in the blockchain in response to the second signature being verified to be valid.

* * * * *